US010175794B2

(12) United States Patent
Du et al.

(10) Patent No.: US 10,175,794 B2
(45) Date of Patent: Jan. 8, 2019

(54) TOUCH SCREEN, MANUFACTURING METHOD THEREOF AND TOUCH DISPLAY APPARATUS

(71) Applicants: BOE Technology Group Co., Ltd., Beijing (CN); Hefei Xinsheng Optoelectronics Technology Co., Ltd., Anhui (CN)

(72) Inventors: Zhi Du, Beijing (CN); Ming Hu, Beijing (CN); Taofeng Xie, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 99 days.

(21) Appl. No.: 15/129,949

(22) PCT Filed: Jul. 1, 2015

(86) PCT No.: PCT/CN2015/083061
§ 371 (c)(1),
(2) Date: Sep. 28, 2016

(87) PCT Pub. No.: WO2016/101581
PCT Pub. Date: Jun. 30, 2016

(65) Prior Publication Data
US 2017/0177127 A1    Jun. 22, 2017

(30) Foreign Application Priority Data
Dec. 22, 2014 (CN) .......................... 2014 1 0810271

(51) Int. Cl.
G06F 3/041    (2006.01)
G06F 3/044    (2006.01)

(52) U.S. Cl.
CPC ............ *G06F 3/0412* (2013.01); *G06F 3/044* (2013.01); *G06F 2203/04103* (2013.01)

(58) Field of Classification Search
None
See application file for complete search history.

(56) References Cited

U.S. PATENT DOCUMENTS

2012/0026107 A1    2/2012   Kim et al.
2014/0300835 A1*  10/2014   Chu ...................... G06F 3/0412
                                                             349/12

(Continued)

FOREIGN PATENT DOCUMENTS

CN    102667688    9/2012
CN    102768599    11/2012

(Continued)

OTHER PUBLICATIONS

First Office Action, including Search Report, for Chinese Patent Application No. 201410810271.3, dated Apr. 5, 2017, 13 pages.

(Continued)

Primary Examiner — Duane N Taylor, Jr.
(74) Attorney, Agent, or Firm — Westman, Champlin & Koehler, P.A.

(57) ABSTRACT

The present disclosure discloses a touch screen and a manufacturing method thereof, as well as a touch display apparatus comprising such a touch screen. The touch screen comprises: a substrate; a sensing component arranged on the substrate; an inner frame layer arranged to surround the sensing component; and an outer frame layer formed around an outer periphery of the inner frame layer, for encapsulating the sensing component and the inner frame layer. During the sensing component made of metal material is manufactured, since the inner frame layer is arranged at the inner side of the outer frame layer, the inner frame layer plays a role of heat insulation from a high temperature generated by the inner (Continued)

side of the outer frame layer, and thus prevents heat from being transferred to the outer frame layer. Therefore, even if a high temperature baking process is used, performance degradation of the outer frame layer caused by the high temperature may also be avoided.

19 Claims, 3 Drawing Sheets

(56) References Cited

U.S. PATENT DOCUMENTS

| | | | | |
|---|---|---|---|---|
| 2014/0333556 | A1* | 11/2014 | Lin | G06F 3/041 345/173 |
| 2015/0145818 | A1* | 5/2015 | Jeon | G06F 3/044 345/174 |
| 2017/0285383 | A1* | 10/2017 | Zhou | G06F 3/041 |

FOREIGN PATENT DOCUMENTS

| | | |
|---|---|---|
| CN | 103455203 A | 12/2013 |
| CN | 203502935 | 3/2014 |
| CN | 103941901 | 7/2014 |
| CN | 104035644 | 9/2014 |
| CN | 204314847 | 5/2015 |
| CN | 104679328 | 6/2015 |

OTHER PUBLICATIONS

Second Office Action for Chinese Patent Application No. 201410810271.3, dated Oct. 20, 2017, 10 pages.
International Search Report and Written Opinion, for International Application No. PCT/CN2015/083061, dated Sep. 22, 2015.
English translation of Box No. V of the Written Opinion, for International Application No. PCT/CN2015/083061, dated Sep. 22, 2015.
Third Office Action, including Search Report, for Chinese Patent Application No. 201410810271.3, dated Apr. 18, 2018, 21 pages.

* cited by examiner

TOUCH SCREEN, MANUFACTURING METHOD THEREOF AND TOUCH DISPLAY APPARATUS

CROSS-REFERENCE TO RELATED APPLICATION

This application is a Section 371 National Stage Application of International Application No. PCT/CN2015/083061, filed on Jul. 1, 2015, which published as WO 2016/101581 on Jun. 30, 2016 and which claims priority to Chinese Application No. 201410810271.3, filed on Dec. 22, 2014, incorporated herein by reference in their entirety.

TECHNICAL FIELD

The present disclosure relates to the field of touch display, and in particular, to a touch screen and a manufacturing method thereof, as well as a touch display apparatus comprising such a touch screen.

BACKGROUND

In a current single layer or one glass solution (OSG) touch screen, a light-shielding layer, a touch-control electrode layer and a wiring layer are arranged on a transparent cover made of transparent material such as glass or transparent resin, and only one piece of transparent cover may achieve a touch-control effect. A surrounding of the OSG touch screen generally forms an outer frame layer made of photoresist and/or screen printing ink material. In general, the ink is used as main material of the outer frame layer of the OSG touch screen. However, both white photoresist and white ink will cause performance degradation of the outer frame layer due to a high temperature baking process performed during manufacture of the touch screen (e.g., a baking process being required to be performed during manufacture of an ITO touch-control electrode), thereby affecting visual effects.

SUMMARY

Embodiments of the present disclosure is to provide a touch screen and a manufacturing method thereof, as well as a touch display apparatus comprising such a touch screen, which can maintain stable performance of the outer frame layer, and thus improve the visual effects of the touch screen.

According to an embodiment of the present disclosure, a touch screen is provided. The touch screen comprises: a substrate; a sensing component arranged on the substrate; an inner frame layer arranged to surround the sensing component; and an outer frame layer formed around an outer periphery of the inner frame layer, for encapsulating the sensing component and the inner frame layer.

According to a touch screen in an embodiment of the present disclosure, an inner side of the outer frame layer covers at least one part of the inner frame layer and/or the sensing component.

According to a touch screen in an embodiment of the present disclosure, a width of the at least one part of the inner frame layer and/or the sensing component is 0.05-0.1 mm.

According to a touch screen in an embodiment of the present disclosure, the outer frame layer is made of ink material.

According to a touch screen in an embodiment of the present disclosure, a wiring layer is arranged on the outer frame layer, and the wiring layer is electrically connected to a sensing electrode of the sensing component, so that the sensing electrode is electrically connected to an external control circuit.

According to a touch screen in an embodiment of the present disclosure, at least one step portion is arranged on an inner side of the outer frame layer, and the wiring layer is electrically connected, via the step portion, to the sensing electrode from a top of the outer frame layer.

According to a touch screen in an embodiment of the present disclosure, the wiring layer is made of silver paste material.

According to a touch screen in an embodiment of the present disclosure, the inner frame layer is made of ink material.

According to a touch screen in an embodiment of the present disclosure, the inner frame layer has a width of 0.1-0.5 mm and a thickness of 6-10 μm.

According to a touch screen in an embodiment of the present disclosure, the sensing component comprises a plurality of first sensing electrodes and a plurality of second sensing electrodes which are arranged to be intersected.

According to a touch screen in an embodiment of the present disclosure, the sensing component further comprises: a plurality of bridging portions, arranged on intersection points of the plurality of first sensing electrodes and the plurality of second sensing electrodes on the substrate; and a plurality of insulating layers, arranged on the substrate and covering the bridging portions, wherein the plurality of first sensing electrodes cross the plurality of insulating layers respectively, and the plurality of second sensing electrodes are electrically connected to the plurality of bridging portions respectively.

According to a touch screen in an embodiment of the present disclosure, the outer frame layer is formed by a plurality of stacked ink layers.

According to a touch screen in an embodiment of the present disclosure, the outer frame layer comprises a white ink layer and a black ink layer which are stacked alternately, wherein the white ink layer comprises at least one white ink sub-layer.

According to another aspect of an embodiment of the present disclosure, a touch display apparatus is provided, comprising a touch screen according to any of the above embodiments.

According to another aspect of an embodiment of the present disclosure, a method of manufacturing a touch screen is provided. The method comprises steps of: forming a sensing component on a substrate; forming an inner frame layer on the substrate by surrounding the sensing component; and forming an outer frame layer on the substrate by surrounding the inner frame layer, to encapsulate the sensing component and the inner frame layer.

According to a method in an embodiment of the present disclosure, the step of forming the outer frame layer on the substrate by surrounding the inner frame layer comprises: forming a plurality of stacked ink layers made of ink material by a screen printing process, so as to form the outer frame layer.

According to a method in an embodiment of the present disclosure, an inner side of the outer frame layer covers at least one part of the inner frame layer and/or the sensing component.

According to a method in an embodiment of the present disclosure, after the outer frame layer being made of ink material is formed by surrounding the inner frame layer, a wiring layer is formed on the outer frame layer by the screen printing process, the wiring layer being electrically connected to a sensing electrode of the sensing component so that the sensing electrode is electrically connected to an external control circuit.

According to a method in an embodiment of the present disclosure, the method further comprises: forming at least one step portion on an inner side of the outer frame layer over the at least one part by the screen printing process, wherein the wiring layer which is electrically connected to the sensing electrode is formed by printing silver paste on a top of the outer frame layer and on the step portion by the screen printing process.

According to a method in an embodiment of the present disclosure, the steps of forming the sensing component on the substrate and forming the inner frame layer on the substrate by surrounding the sensing component comprise: forming a plurality of bridging portions on the substrate by a patterning process; forming a plurality of insulating layers on the substrate which cover the plurality of bridging portions respectively; forming the inner frame layer on the substrate which surrounds the plurality of bridging portions, wherein there is a gap between the inner frame layer and the outermost bridging portion; and forming a sensing electrode of the sensing component on the substrate by the patterning process, wherein the sensing electrode comprises a plurality of first sensing electrodes and a plurality of second sensing electrodes which are arranged to be intersected, the plurality of first sensing electrodes crossing the plurality of insulating layers respectively, and the plurality of second sensing electrodes being electrically Connected to the plurality of bridging portions respectively.

According to a method in an embodiment of the present disclosure, the inner frame layer is made of ink material by a screen printing process.

According to a touch screen and a manufacturing method thereof as well as a touch display apparatus comprising such a touch screen, during the sensing component made of metal material is manufactured, since the inner frame layer is arranged at the inner side of outer frame layer, the inner frame layer plays a role of heat insulation from a high temperature generated by the inner side of the outer frame layer, and thus prevents heat from being transferred to the outer frame layer. Therefore, even if a high temperature baking process is used, performance degradation of the outer frame layer caused by the high temperature may also be avoided.

BRIEF DESCRIPTION OF THE DRAWINGS

In order to illustrate the objects, technical solutions and advantages of the present disclosure more clearly, particular embodiments of the present disclosure will be described in detail with reference to the drawings, in which.

DETAILED DESCRIPTION

Hereinafter, technical solutions of the present disclosure will be described in detail by the embodiments with reference to the drawings. In the specification, same or similar reference numbers refer to the same or similar parts. The description of the embodiments of the present disclosure with reference to the drawings intends to explain a general inventive concept of the present disclosure, and should not be understood as limitations on the present disclosure.

According to the general inventive concept of the present disclosure, a touch screen is provided, comprising: a substrate; a sensing component arranged on the substrate; an inner frame layer arranged to surround the sensing component; and an outer frame layer formed around an outer periphery of the inner frame layer, for encapsulating the sensing component and the inner frame layer. During the sensing component made of metal material is manufactured, since the inner frame layer is arranged at the inner side of outer frame layer, the inner frame layer plays a role of heat insulation from a high temperature generated by the inner side of the outer frame layer, and thus prevents heat from being transferred to the outer frame layer. Therefore, even if a high temperature baking process is used, performance degradation of the outer frame layer caused by the high temperature may also be avoided.

In the following detailed description, many particular details are illustrated for providing complete understanding on the embodiments of the present disclosure for facilitating explanations thereof. Obviously, however, one or more embodiments may be implemented without these particular details, either. In other cases, well-known structures and apparatuses are shown schematically for simplifying the drawings.

Figure 1:
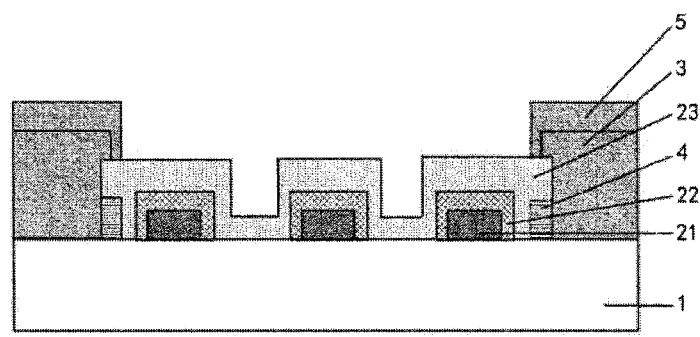
FIG. 1 is a schematic cross-sectional view of a touch screen according to a first exemplary embodiment of the present disclosure.
Figure 2:
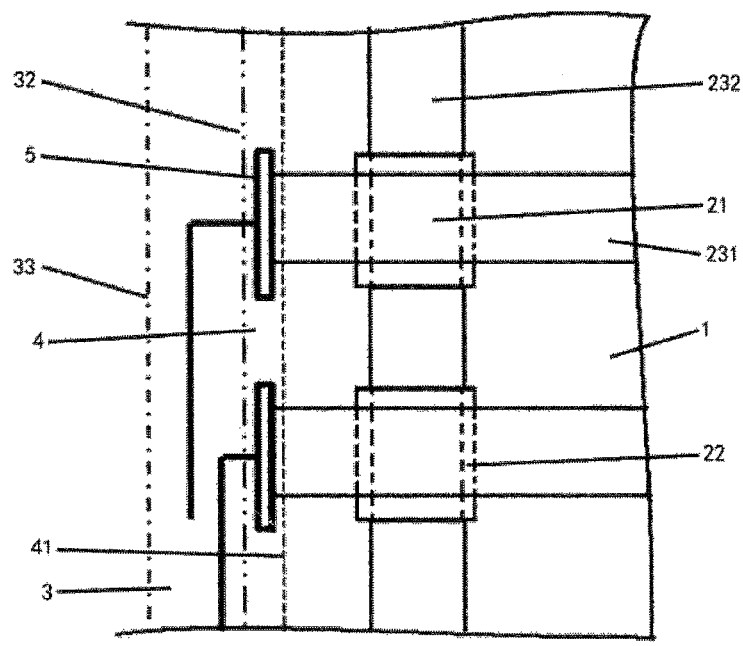
FIG. 2 is a partially enlarged planar schematic view of a left part of the touch screen as shown in FIG. 1.

FIG. 1 is a schematic cross-sectional view of a touch screen according to a first exemplary embodiment of the present disclosure, and FIG. 2 is a partially enlarged planar schematic view of a left part of the touch screen as shown in FIG. 1. With reference to FIGS. 1 and 2, the touch screen according to an embodiment of the present disclosure, e.g., an OGS touch screen, comprises a substrate 1 made of e.g. glass or transparent resin material; a sensing component (to be described later) arranged on the substrate 1, for sensing an external touch action; an inner frame layer 4 arranged to surround the sensing component; and an outer frame layer 3 formed around an outer periphery of the inner frame layer, for encapsulating the sensing component and the inner frame layer 4.

In an exemplary embodiment, as shown in FIGS. 1 and 2, the sensing component comprises a plurality of first sensing electrodes 231 and a plurality of second sensing electrodes 232 (collectively referred to as sensing electrodes 23) which are arranged to be intersected for forming touch capacitors. The plurality of first sensing electrodes 231 and the plurality of second sensing electrodes 232 are made of any one or combinations of transparent conductive materials such as Indium Tin Oxide (ITO), Indium Zinc Oxide (IZO), Indium Tin Zinc Oxide (ITZO), Tin Oxide (TO) etc. In a pulse period, when a display screen is touched by e.g. a finger, a capacitance value of an sensing capacitor will be changed, and thus an output voltage of a related circuit will be changed. A touched position may be determined according to variation of the voltage, so as to implement a touch sensitive function.

In an exemplary embodiment, the sensing component further comprises a plurality of bridging portions 21 made of e.g. ITO material and a plurality of insulating layers 22 made of e.g. silicon oxide (SiOx) and/or silicon nitride (SiNx) material. The plurality of bridging portions 21 are arranged on intersection points of the plurality of first sensing electrodes 231 and the plurality of second sensing electrodes 232 on the substrate 1. The plurality of insulating layers 22 are arranged on the substrate 1 and cover the respective bridging portions 21. The plurality of first sensing electrodes 231 cross the plurality of insulating layers 22 respectively, and the plurality of second sensing electrodes 232 are electrically connected to the plurality of bridging portions 21 respectively, so as to implement intersection arrangement of the plurality of first sensing electrodes 231 and the plurality of second sensing electrodes 232.

In an exemplary embodiment, as shown in FIGS. 1 and 2, an inner side of the outer frame layer 3 covers at least one part of the inner frame layer 4 and/or the sensing component, e.g., covers ends of the first sensing electrode 231 and the second sensing electrode 232. For example, a width W of the at least one part of the inner frame layer and/or the sensing component is 0.05-0.1 mm. This may enable the outer frame layer 3 to protect the inner frame layer 4 and the ends of the first sensing electrode 231 and the second sensing electrode 232, in order to improve encapsulation performance. Especially, both the inner frame layer 4 and the outer frame layer 3 are formed layer by layer with ink material using a screen printing process, and such a covering way may improve accuracy of the screen printing.

In an embodiment, the outer frame layer 3 is made of ink material (e.g., white and/or black ink) by the screen printing process, so as to improve the visual effect of the touch screen. However, the present disclosure is not limited to this. In an alternative embodiment, the outer frame layer 3 may be made of light oil coating. In a case that the outer frame layer is made of ink material, the inner frame layer may enable the outer frame layer to be kept away from a high-temperature manufacture process, which may avoid the white ink for making the outer frame to turn yellow due to a high temperature, and can obtain a touch screen with a white outer frame layer, thereby enhancing the visual effect of the touch screen.

In an exemplary embodiment, a wiring layer 5 is arranged on the outer frame layer 3, and the wiring layer 5 is electrically connected to the first sensing electrode 231 and the second sensing electrode 232 of the sensing component, so that the first and the second sensing electrodes are electrically connected to an external control circuit, e.g., a flexible circuit board (not shown). As such, the external control circuit may output a control signal to the sensing electrode, and processes an electric signal which is received from the sensing electrode 23 and represents whether a sensing action occurs.

Figure 4:
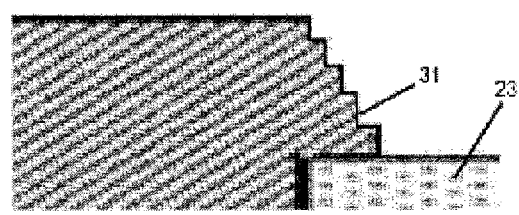
FIG. 4 is an enlarged schematic view of Part A in FIG. 3e.

In an embodiment, as shown in FIG. 4, at least one step portion, is arranged on the inner side of the outer frame layer, and the wiring layer 5 is electrically connected, via the step portion 31, to the sensing electrode from a top of the outer frame layer. By arranging such a step structure, adhesion capability of the wiring layer 5 to the outer frame layer 3 may be improved. Further, the wiring layer 5 is made of silver paste material by the screen printing process.

As shown in FIG. 2, each wire of the wiring layer 5 extends from the inner frame layer 4 to the outer frame layer 3 via the step portion (not shown in FIG. 2) on an inner edge 32 of the outer frame layer 3, and is electrically connected to the external control circuit (e.g. the flexible circuit board) from the top of the outer frame layer 3. FIG. 2 further shows an inner edge 41 of the inner frame layer 4 and an outer edge 33 of the outer frame layer 3.

Since the silver paste material has a worse climbing capability, arranging the step portion 31 on the outer frame layer 3 may facilitate to screen print the silver paste material on the outer frame layer, and may enable the wiring layer 5 to adhere to the step portion 31 tightly. In another exemplary embodiment, the wiring layer 5 may be made of carbon paste material. The wiring layer is formed, instead of the metal wiring layer, by screen printing the silver paste, so that the white ink may be kept away from the high-temperature manufacture process, and may be avoided to turn yellow, so as to obtain a touch screen with a white outer frame layer.

In an exemplary embodiment, the outer frame layer 3 is formed by a plurality of stacked ink layers. For example, the outer frame layer 3 comprises white ink layers and black ink layers which are stacked alternately, in which the white ink layer includes at least one white ink sub-layer. For example, the outer frame layer 3 may comprise two white ink layers and one black ink layer, or comprise three white ink layers and one black ink layer. For example, in order to ensure light shielding performance of the outer frame layer 3, a layer of white ink is firstly screen printed, and then a layer of black ink is screen printed. Since the silver paste is to be screen printed subsequently for forming the wiring layer 5, a multi-layer printing method may be used and respective layers are expanded sequentially, if the climbing capability of the silver paste is worse. Since the outer frame layer 3 is formed by stacking the ink material layer by layer using the screen printing process, which facilitates to form the step portion 31 from a bottom of the outer frame layer 3 which covers the at least one part of the inner frame layer 4 and/or the sensing electrode 23 to a top of the outer frame layer 3, respective steps may be shifted outward sequentially by 0.1-0.5 mm to form better steps, so that the silver paste material may adhere to the step portion 31 toughly and reach the top of the outer frame layer. Considering the light-shielding capability of the outer frame layer, a thickness of the outer frame layer 3 is about 30 μm.

In an exemplary embodiment, the inner frame layer 4 is made of ink material (e.g., white ink) using the screen printing process. It may be understood that although the thicker the better for the inner frame layer 3, considering that the sensing electrode 23 will be formed on a top of the inner frame layer 4 from the substrate 1 at the bottom, the inner frame layer 4 may have a thickness of 6-10 μm due to the limited climbing capability of the sensing electrode 23 made of ITO material. In addition, considering the accuracy of the screen printing process, the inner frame layer has a width of 0.1-0.5 mm.

According to an embodiment in another aspect of the present disclosure, a touch display apparatus is provided, comprising the touch screen as described in the above various embodiments. The touch display apparatus may be a mobile phone, a tablet computer, a TV, a display, a notebook, a digital frame, a navigator, e-paper and any other product or component having the display function.

According to an embodiment in another aspect of the present disclosure, a method of manufacturing a touch screen is provided, comprising: forming a sensing component on a substrate 1; forming an inner frame layer 4 on the substrate 1 by surrounding the sensing component; and forming an outer frame layer 3 on the substrate 1 by surrounding the inner frame layer 4, to encapsulate the sensing component and the inner frame layer 4. During the sensing component made of metal material is manufactured, since the inner frame layer is arranged at the inner side of outer frame layer, the inner frame layer plays a role of heat insulation from a high temperature generated by the inner side of the outer frame layer, and thus prevents heat from being transferred to the outer frame layer. Therefore, even if a high temperature baking process is used, performance degradation of the outer frame layer caused by the high temperature may also be avoided.

Figure 3A:
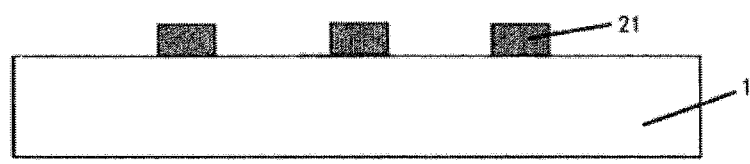
FIGS. 3a-3f are cross-sectional views illustrating operation processes of manufacturing a touch screen of the present disclosure.
Figure 3B:
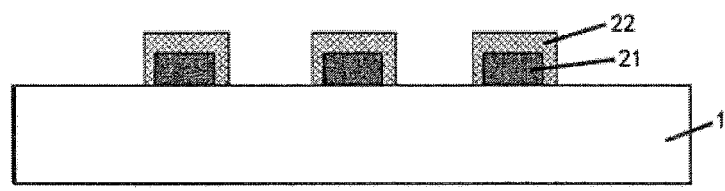
Figure 3C:
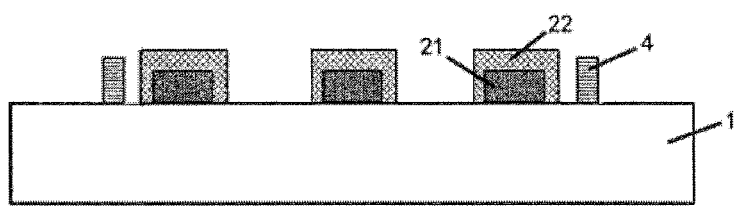
Figure 3D:
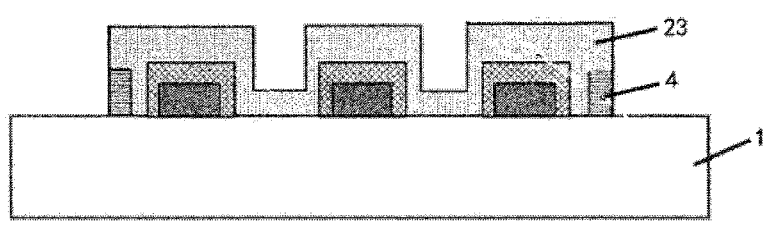

In an exemplary embodiment, the steps of forming the sensing component on the substrate 1 and forming the inner frame layer 4 on the substrate 1 by surrounding the sensing component comprise:

forming a plurality of bridging portions 21 on the substrate 1 by a patterning process which includes coating photoresist, exposing, developing and etching, as shown in FIG. 3a;

forming a plurality of insulating layers 22 on the substrate 1 which cover the plurality of bridging portions 21 respectively, as shown in FIG. 3b;

forming the inner frame layer 4 on the substrate 1 which surrounds the plurality of bridging portions 21, wherein there is a gap between the inner frame layer 4 and the outermost bridging portion 21, as shown in FIG. 3c; and forming a sensing electrode 23 of the electrode component on the substrate by the patterning process which includes coating photoresist, exposing, developing and etching, wherein the sensing electrode 23 comprises a plurality of first sensing electrodes 231 and a plurality of second sensing electrodes 232 which are arranged to be intersected, the plurality of first sensing electrodes 231 cross the plurality of insulating layers 22 respectively, and the plurality of second sensing electrodes 232 are electrically connected to the plurality of bridging portions 21 respectively, as shown in FIG. 3d. An outermost side of each sensing electrode 23 extends from the gap to the top of the inner frame layer 4. The inner frame layer 4 may have a thickness of 6-10 μm due to the limited climbing capability of the sensing electrode 23 made of ITO material. In addition, considering the accuracy of the screen printing process, the inner frame layer has a width of 0.1-0.5 mm.

Figure 3E:
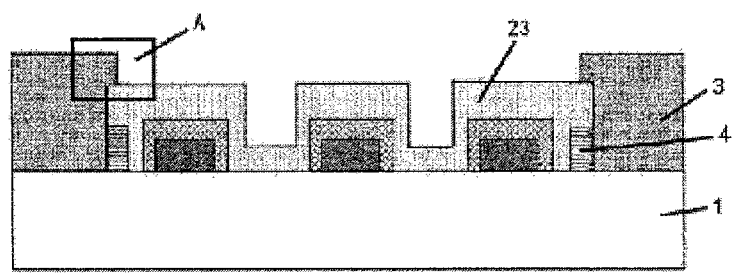

In an exemplary embodiment, as shown in FIG. 3e, the step of forming the outer frame layer 3 on the substrate 1 by surrounding the inner frame layer 4 comprises: forming a plurality of stacked ink layers made of ink material by the screen printing process, so as to form the outer frame layer 3. The outer frame layer 3 is formed by a plurality of stacked ink layers which are formed by a plurality of screen printing. For example, the outer frame layer 3 comprises white ink layers and black ink layers which are stacked alternately, in which the white ink layer includes at least one white ink sub-layer. For example, the outer frame layer 3 may comprise two white ink layers and one black ink layer, or comprise three white ink layers and one black ink layer. For example, in order to ensure light shielding performance of the outer frame layer 3, a layer of white ink is firstly screen printed, and then a layer of black ink is screen printed.

According to the method of manufacturing the touch screen in the embodiment of the present disclosure, in a case that the outer frame layer is made of ink material, since the outer frame layer is formed by the screen printing process after the bridging port on end the sensing electrode are formed with ITO material, the formed inner frame layer enable the outer frame layer to be kept away from the high-temperature manufacture process, so as to allow the high-temperature process to be used in the process of forming the sensing electrode by ITO coating film, thereby improving transmissivity of the touch screen; and to avoid the white ink for making the outer frame to turn yellow due to the high temperature, thereby enhancing the visual effect of the touch screen.

In an exemplary embodiment, the inner side of the outer frame layer covers at least one part of the inner frame layer and/or the sensing component. This may enable the outer frame layer 3 to protect the inner frame layer 4 and the ends of the first sensing electrode 231 and the second sensing electrode 232, in order to improve encapsulation performance. Especially, both the inner frame layer 4 and the outer frame layer 3 are formed layer by layer with ink material using a screen printing process, and such a covering way may improve accuracy of the screen printing.

Figure 3F:
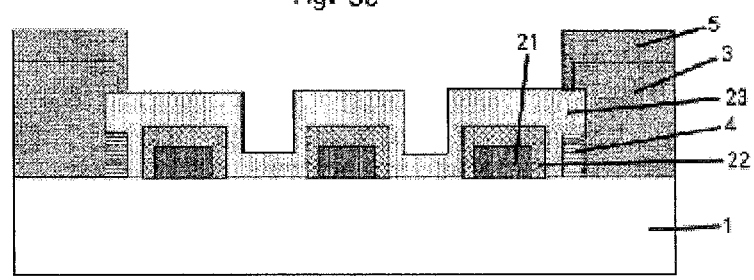

In an exemplary embodiment, as shown in FIG. 3f, after the outer frame layer 3 is formed by ink material on the substrate 1 by surrounding the inner frame layer 4, the wiring layer 5 is formed on the outer frame layer 3 by the screen printing process, and the wiring layer 5 is electrically connected to the sensing electrode 23 of the sensing component, so that the sensing electrode is electrically connected to the external control circuit (not shown). The wiring layer is formed, instead of the metal wiring layer, by screen printing the silver paste, so that the white ink may be kept away from the high-temperature manufacture process, and may be avoided to turn yellow, so as to obtain a touch screen with a white outer frame layer.

In an exemplary embodiment, as shown in FIG. 4, at least one step portion 31 is formed on the inner side of the outer frame layer 3 over the at least one part of the inner frame layer 4 and/or the sensing component by the screen printing process. In the process of screen printing the ink layer, respective layers are expanded sequentially to form the step portion 31. Respective steps may be shifted outward sequentially by 0.1-0.5 mm to form better steps. In addition, as shown in FIG. 3f, the silver paste is printed on the top of the outer frame layer 3 and on the step portion 31, so as to form the wiring layer 5 electrically connected to the sensing electrode 23.

In an exemplary embodiment, the inner frame layer 4 is made of ink material using the screen printing process. It may be understood that although the thicker the better for the inner frame layer 3, considering that the sensing electrode 23 will be formed on the top of the inner frame layer 4 from the substrate 1 at the bottom, the inner frame layer 4 may have a thickness of 6-10 μm due to the limited climbing capability of the sensing electrode 23 made of ITO material.

According to a touch screen and a manufacturing method thereof as well as a touch display apparatus comprising such a touch screen, during the sensing component made of metal material is manufactured, since the inner frame layer is arranged at the inner side of outer frame layer, the inner frame layer plays a role of heat insulation from a high temperature generated by the inner side of the outer frame layer, and thus prevents heat from being transferred to the outer frame layer. Therefore, even if a high temperature baking process is used, performance degradation of the outer frame layer caused by the high temperature may also be avoided.

Further, in the case that the outer frame layer is made of ink material, the inner frame layer may enable the outer frame layer to be kept away from the high-temperature manufacture process, so as to allow the high-temperature process to be used in the process of forming the sensing electrode by ITO coating film, thereby improving the transmissivity of the touch screen. In addition, the white ink for making the outer frame may be avoided to turn yellow due to the high temperature, thereby enhancing the visual effect of the touch screen.

The above descriptions are merely particular embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure as defined by the claims and their equivalents.

We claim:

1. A touch screen, comprising:
a substrate;
a sensing component arranged on the substrate;
an inner frame layer arranged to surround the sensing component; and
an outer frame layer formed around an outer periphery of the inner frame layer, for encapsulating the sensing component and the inner frame layer,
wherein at least one step portion is arranged on an inner side of the outer frame layer; and
wherein the inner frame layer has a width of 0.1-0.5 mm and a thickness of 6-10 µm.

2. The touch screen according to claim 1, wherein an inner side of the outer frame layer covers at least one part of the inner frame layer and/or the sensing component.

3. The touch screen according to claim 2, wherein a width of the at least one part of the inner frame layer and/or the sensing component is 0.05-0.1 mm.

4. The touch screen according to claim 1, wherein the outer frame layer is made of ink material.

5. The touch screen according to claim 1, wherein a wiring layer is arranged on the outer frame layer, and the wiring layer is electrically connected to a sensing electrode of the sensing component, so that the sensing electrode is electrically connected to an external control circuit.

6. The touch screen according to claim 5, wherein the wiring layer is electrically connected, via the step portion, to the sensing electrode from a top of the outer frame layer.

7. The touch screen according to claim 5, wherein the wiring layer is made of silver paste material.

8. The touch screen according to claim 1, wherein the inner frame layer is made of ink material.

9. The touch screen according to claim 1, wherein the sensing component comprises a plurality of first sensing electrodes and a plurality of second sensing electrodes which are arranged to be intersected.

10. The touch screen according to claim 9, wherein the sensing component further comprises:
a plurality of bridging portions, arranged on intersection points of the plurality of first sensing electrodes and the plurality of second sensing electrodes on the substrate; and
a plurality of insulating layers, arranged on the substrate and covering the bridging portions,
wherein the plurality of first sensing electrodes cross the plurality of insulating layers respectively, and the plurality of second sensing electrodes are electrically connected to the plurality of bridging portions respectively.

11. The touch screen according to claim 9, wherein the outer frame layer is formed by a plurality of stacked ink layers.

12. The touch screen according to claim 11, wherein the outer frame layer comprises a white ink layer and a black ink layer which are stacked alternately, wherein the white ink layer comprises at least one white ink sub-layer.

13. A touch display apparatus, comprising a touch screen according to claim 1.

14. A method of manufacturing a touch screen, comprising steps of:
forming a sensing component on a substrate;
forming an inner frame layer on the substrate by surrounding the sensing component;
forming an outer frame layer on the substrate by surrounding the inner frame layer, to encapsulate the sensing component and the inner frame layer;
forming at least one step portion of an inner side of the outer frame layer over the at least one part of the sensing component by a screen printing process; and
wherein the inner frame layer has a width of 0.1-0.5 mm and a thickness of 6-10 µm.

15. The method according to claim 14, wherein the step of forming the outer frame layer on the substrate by surrounding the inner frame layer comprises:
forming a plurality of stacked ink layers made of ink material by a screen printing process, so as to form the outer frame layer.

16. The method according to claim 15, wherein an inner side of the outer frame layer covers at least one part of the inner frame layer and/or the sensing component.

17. The method according to claim 16, wherein after the outer frame layer being made of ink material is formed by surrounding the inner frame layer, a wiring layer is formed on the outer frame layer by the screen printing process, the wiring layer being electrically connected to a sensing electrode of the sensing component so that the sensing electrode is electrically connected to an external control circuit.

18. The method according to claim 17,
wherein the wiring layer which is electrically connected to the sensing electrode is formed by printing silver paste on a top of the outer frame layer and on the step portion by the screen printing process.

19. The method according to claim 14, wherein the steps of forming the sensing component on the substrate and forming the inner frame layer on the substrate by surrounding the sensing component comprise:
forming a plurality of bridging portions on the substrate by a patterning process;
forming a plurality of insulating layers on the substrate which cover the plurality of bridging portions respectively;
forming the inner frame layer on the substrate which surrounds the plurality of bridging portions, wherein the inner frame layer is made of ink material by a screen printing press and there is a gap between the inner frame layer and the outermost bridging portion; and
forming a sensing electrode of the sensing component on the substrate by the patterning process, wherein the sensing electrode comprises a plurality of first sensing electrodes and a plurality of second sensing electrodes which are arranged to be intersected, the plurality of first sensing electrodes crossing the plurality of insulating layers respectively, and the plurality of second sensing electrodes electrically being connected to the plurality of bridging portions respectively.

* * * * *